United States Patent
Kowatari et al.

(10) Patent No.: US 10,650,251 B2
(45) Date of Patent: May 12, 2020

(54) MONITORING IMAGE DISPLAY DEVICE OF INDUSTRIAL MACHINE

(71) Applicant: HITACHI CONSTRUCTION MACHINERY CO., LTD., Tokyo (JP)

(72) Inventors: Yoichi Kowatari, Tsuchiura (JP); Hidefumi Ishimoto, Tsuchiura (JP); Moritaka Oota, Tsuchiura (JP); Yoshihiro Inanobe, Tsuchiura (JP); Hiroyoshi Tanaka, Tsuchiura (JP); Kouji Fujita, Tsuchiura (JP); Takashi Kusama, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 16/158,346

(22) Filed: Oct. 12, 2018

(65) Prior Publication Data

US 2019/0042858 A1 Feb. 7, 2019

Related U.S. Application Data

(63) Continuation of application No. 14/916,058, filed as application No. PCT/JP2015/051402 on Jan. 20, 2015, now abandoned.

(51) Int. Cl.
*G06K 9/00* (2006.01)
*H04N 7/18* (2006.01)
(Continued)

(52) U.S. Cl.
CPC ............ *G06K 9/00791* (2013.01); *B60R 1/00* (2013.01); *E02F 9/24* (2013.01); *E02F 9/261* (2013.01);
(Continued)

(58) Field of Classification Search
USPC .......................................... 348/148
See application file for complete search history.

(56) References Cited

U.S. PATENT DOCUMENTS

2001/0030081 A1* 10/2001 Morimoto ................. B60R 3/02
182/85
2003/0085995 A1* 5/2003 Sawada .................. H04N 7/183
348/118
(Continued)

FOREIGN PATENT DOCUMENTS

CN 103025581 A 4/2013
EP 2 712 969 A1 4/2014
(Continued)

OTHER PUBLICATIONS

International Search Report of PCT/JP2015/051402.

*Primary Examiner* — Thai Q Tran
*Assistant Examiner* — Nienru Yang
(74) *Attorney, Agent, or Firm* — Mattingly & Malur, PC

(57) ABSTRACT

In an industrial machine, the work safety is further improved by eliminating blind spots from an image displayed on a monitor. A hydraulic excavator 1 which is the industrial machine is equipped with monitoring cameras 15F, 15B, 15L, 15R mounted in the respective places of a revolving upperstructure 3 in order to capture images for monitoring. A monitor 20 displays camera images 21F, 21B, 21L, 21R obtained by the cameras as well as an icon image 21C of an image illustration of the hydraulic excavator 1. The cameras 15F, 15L, 15R are mounted at the distal ends of support arms 40F, 40L, 40R to be located in positions jutting from a revolving upperstructure main unit 3a of the revolving upperstructure 3, so that a hidden area under the underside of a catwalk 14 provided on the revolving upperstructure 3 falls within the field of view.

3 Claims, 10 Drawing Sheets

(51) Int. Cl.
*B60R 1/00* (2006.01)
*E02F 9/26* (2006.01)
*E02F 9/24* (2006.01)
*G06T 11/60* (2006.01)
*H04N 5/247* (2006.01)

(52) U.S. Cl.
CPC ............ *G06T 11/60* (2013.01); *H04N 5/247* (2013.01); *H04N 7/181* (2013.01); *B60R 2300/105* (2013.01); *B60R 2300/305* (2013.01); *B60R 2300/607* (2013.01)

(56) References Cited

U.S. PATENT DOCUMENTS

| | | | |
|---|---|---|---|
| 2008/0151053 A1* | 6/2008 | Ishii | B60R 1/00 348/148 |
| 2011/0285848 A1* | 11/2011 | Han | B60R 1/00 348/148 |
| 2013/0278772 A1* | 10/2013 | Yun | B60K 35/00 348/148 |
| 2015/0138360 A1 | 5/2015 | Kowatari et al. | |

FOREIGN PATENT DOCUMENTS

| | | | | |
|---|---|---|---|---|
| JP | 2010-204821 A | 9/2010 | | |
| JP | 2012-252675 A | 12/2012 | | |
| JP | 2013-124467 A | 6/2013 | | |
| WO | 2012/157379 A1 | 11/2012 | | |
| WO | 2012/157438 A1 | 11/2012 | | |
| WO | 2013/105597 | 7/2013 | | |
| WO | WO-2013105597 A1 * | 7/2013 | ............... | B60R 1/00 |
| WO | 2013/172172 A1 | 11/2013 | | |

\* cited by examiner

MONITORING IMAGE DISPLAY DEVICE OF INDUSTRIAL MACHINE

TECHNICAL FIELD

The present invention relates to a monitoring image display device of an industrial machine, such as, in particular, a large hydraulic excavator for mining, a dump truck, a road construction machine, and the like, to monitor the surroundings of the industrial machine during operation.

BACKGROUND ART

As the industrial machine, for example, a hydraulic excavator has a lower travel base and a revolving upperstructure which is revolvably coupled to the lower travel base. The revolving upperstructure is equipped with a front working mechanism as a working mechanism. The front working mechanism has a boom and an arm. The boom is mounted to the revolving upperstructure in such a manner as to be raised/lowered. The arm is vertically rotatably coupled to the distal end of the boom. The distal end of the arm is equipped with a front attachment. The front attachment is a bucket when used in excavation work.

It is well known in the art to provide a surround monitoring device to monitor the surrounding circumstances of the revolving upperstructure in order to ensure work safety while the front working mechanism serving as the working mechanism is driven to carry out earth/soil excavation work and/or the like. The surround monitoring device is configured to include a camera mounted to the revolving upperstructure, and a monitor placed, within a cab, in front of the operator seat in which the operator is to sit. Images taken by the camera are displayed on the monitor screen in the form of moving images. Also, ensuring the safety during traveling of the hydraulic excavator and during excavation work or the like, and the like, requires the field of view covering the rear and both the left and right sides of the revolving upperstructure. In order to provide a wide-angle field of view around the hydraulic excavator which is the industrial machinery, the revolving upperstructure equipped with a plurality of cameras is conventionally used. This eliminates blind spots from almost all around the revolving upperstructure, ensuring the work safety and improving the maneuverability of the industrial machine.

Patent Literature 1 discloses the configuration in which view transformation processing is applied to images of the surroundings of the industrial machine captured by a plurality of cameras for a view from above so that the images are displayed as two-dimensionally-projected top-view monitoring images on the monitor screen. With the configuration in Patent Literature 1, the plurality of cameras are mounted to the revolving upperstructure of the hydraulic excavator and the images of the respective cameras are combined on the monitor screen in order to obtain the surround monitoring image.

The cameras are mounted in three locations, in a position in a rear portion of and positions in the right and left side portions of the hydraulic excavator, in which the optical axis of the imaging lens of each of the cameras is directed in an obliquely downward direction. An image taken by each camera is a through image, so that the view transformation processing is applied to the through image to obtain a monitoring image. The view after the transformation is a view from above, thereby obtaining the three top-view images projected from above the hydraulic excavator.

With this configuration, the top-view images are displayed on the monitor screen, in which an image illustration symbolically showing the hydraulic excavator (specifically, a plane image illustration of the hydraulic excavator) is displayed on the monitor screen and the top-view images captured by the respective cameras are arranged around the image illustration. More specifically, the image illustration is displayed on a central position of the monitor screen and the top-view images are arranged respectively in regions on the rear side and the left and right sides of the image illustration, resulting in displaying the bird's-eye view image for surround monitoring.

CITATION LIST

Patent Literature

Patent Literature 1: Japanese Patent Application Laid-Open No. 2010-204821

SUMMARY OF INVENTION

Technical Problem

Such a hydraulic excavator is also used for mining in a mine. The hydraulic excavator for mining, which is very large in size, is structured to include a crawler-type lower travel base having left and right crawler belts. The revolving upperstructure installed through a revolving apparatus onto the lower travel base is located at a height of 1.8 meters or more from ground level. In this manner, the cameras are mounted to the revolving upperstructure and a large empty space exists in a position under the underside of a vehicle frame of the revolving upperstructure. In the situation in which a worker working around the hydraulic excavator enters the space under the underside of the vehicle frame of the revolving upperstructure, the worker may possibly not be captured within the field of view of the surround-monitoring camera.

Enhancing the effectiveness of the monitoring of the surrounding to the industrial machine involves a lessening of the section of blind spot of the monitoring camera, and it is desired for this purpose that the blind spot is absent. Locations of interest to be monitored do not include, understandably, a location at a distance from the industrial machine where the operation of the industrial machine is not affected, a space-limited location where a worker and the like cannot enter, and the tread of the crawler band forming part of the lower travel base which touches the ground. However, especially, for a large/heavy industrial machine, there is a necessity to cause the field of view of the monitor cameras to cover the areas under the underside of the frame of the revolving upperstructure and the section extending out from the frame to the extent possible.

The present invention has been made in light of the aforementioned points and it is an object of the invention to expand the range of the field of view of the monitoring cameras for a further enhancement in the effectiveness of surround monitoring.

Solution to Problem

To address the aforementioned technical problems, the present invention provides a monitoring image display device installed on an industrial machine which has a movable mechanism provided at least in a part, the monitoring image display device including: one or more monitoring cameras which are placed in a location at least partially extending beyond an outline region to have a field of view covering the surroundings of the industrial machine; an image generating unit that generates top-view images captured by the monitoring cameras looking downward from above; an icon-image generating unit that generates an icon image representing a plane of the industrial machine with at least the outline being shown in a graphic form; an image compositing unit that performs composite processing to display an image captured by the image generating unit around the icon image generated by the icon-image generating unit; and an image display unit that displays the top-view images composited by the image compositing unit to include part of a section hidden within a display region of the icon image.

The monitoring image display device of the industrial machine according to the present invention is a device used in an industrial machine to check for safety of the surroundings of the industrial machine during its operation, and the industrial machine has a movable mechanism mounted to at least a part thereof. Specifically, the movable mechanism includes a working mechanism, traveling mechanism and/or the like. For safe operation of the movable mechanism structured as described above, monitoring using images is performed. The images are displayed on the image display unit, namely, the monitor. As display mode, a plane image of the industrial machine is displayed as an icon image. The icon image is represented in an outline.

Images captured by the monitoring cameras, together with the icon image, are displayed. Therefore, the images of the monitoring cameras are top-view images. For the purpose, the monitoring cameras are located at high elevations so that the optical axis is oriented downward so as to obtain a top-view image. The monitoring cameras are designed to be placed in at least one location or a plurality of locations, and four or more monitoring cameras are preferably mounted in order to photograph the overall surroundings of the industrial machine. The plurality of monitoring cameras are arranged such that their fields of view overlap each other, and the images are trimmed for display with continuity between adjacent images.

Because of the structure of the industrial machine, an empty space is created in an underside position in the outside shape of the industrial machine. For example, a large hydraulic excavator, which is an industrial machine, is equipped with a catwalk for the passage of the operator and the like. The catwalk is provided as a structure to jut outward from the frame of the revolving upperstructure. In order to monitor the area under the underside of the catwalk, an image of a section hidden within the icon image is also displayed.

The monitoring cameras are sited at high elevations for sections forming the outside shape of the machine, such as the catwalk and the like. In addition, the monitoring cameras are placed in positions jutting outward relative to the outline of the structure. This enables displaying a ground surface image including the sections positioned inward of the outside shape. A further increase in the field of view toward the center involves a further increase in height of the camera position to exceed the section defining the outside shape, and also a further increase in length of jutting from the outside shape. However, an increase in the amount of jutting upward and forward correspondingly increases the possibility of collision with any other substance. Accordingly, the amount of jutting is limited.

In a machine with a revolving upperstructure revolvably mounted on a lower travel base as in the case of the hydraulic excavator, a revolving radius of the revolving upperstructure is determined as a critical position of the jutting length of the position at which the camera is mounted. For safe revolving, a collision with other substance and/or the like must be avoided within the revolving radius of the revolving upperstructure. During operation, other substance and the like are prevented from entering the area within the revolving radius. As a result, the critical position of the jutting length of the mounting position of the camera is able to be determined within the revolving radius of the revolving upperstructure. Then, a support arm is installed to a predetermined position of a revolving upperstructure main unit forming part of the revolving upperstructure of the hydraulic excavator, so that the camera is mounted to the distal end of the support arm. The support arm may be structured to be adjustable in length in order to make the mounting position of the camera adjustable. However, if strong vibrations may be created such as in the hydraulic excavator, the mounting position of the camera must be prevented from being displaced. Because of this, the support arm is desirably installed in a rigid manner.

Next, the hydraulic excavator includes a front working mechanism as a working mechanism installed to the revolving upperstructure for earth/soil excavation. The front working mechanism includes a boom attached to the revolving frame of the revolving upperstructure to be capable of being raised/lowered, an arm coupled to the distal end of the boom to be rotatable in the vertical direction, and a bucket coupled to the distal end of the arm via an articulated mechanism. During excavation, the bucket is engaged into the ground. Accordingly, during excavation operation, the section in which the bucket makes contact with the ground is a danger region which any other vehicle and worker must be prevented from entering.

For this reason, when the hydraulic excavator is in a predetermined position, that is, when the revolving upperstructure is in a position at a predetermined angle, it is important in terms of work safety that the region in which excavation using the bucket will be carried out is displayed on the monitor. In particular, when doing the excavation work by remote control without the operator aboard, displaying the location of interest for excavation on the monitor is critical in terms of work safety and efficiency.

Advantageous Effects of Invention

In the industrial machine such as the hydraulic excavator and the like, a decrease in blind spots in an image displayed on the monitor provides a higher level of work safety.

DESCRIPTION OF EMBODIMENTS

Figure 1:
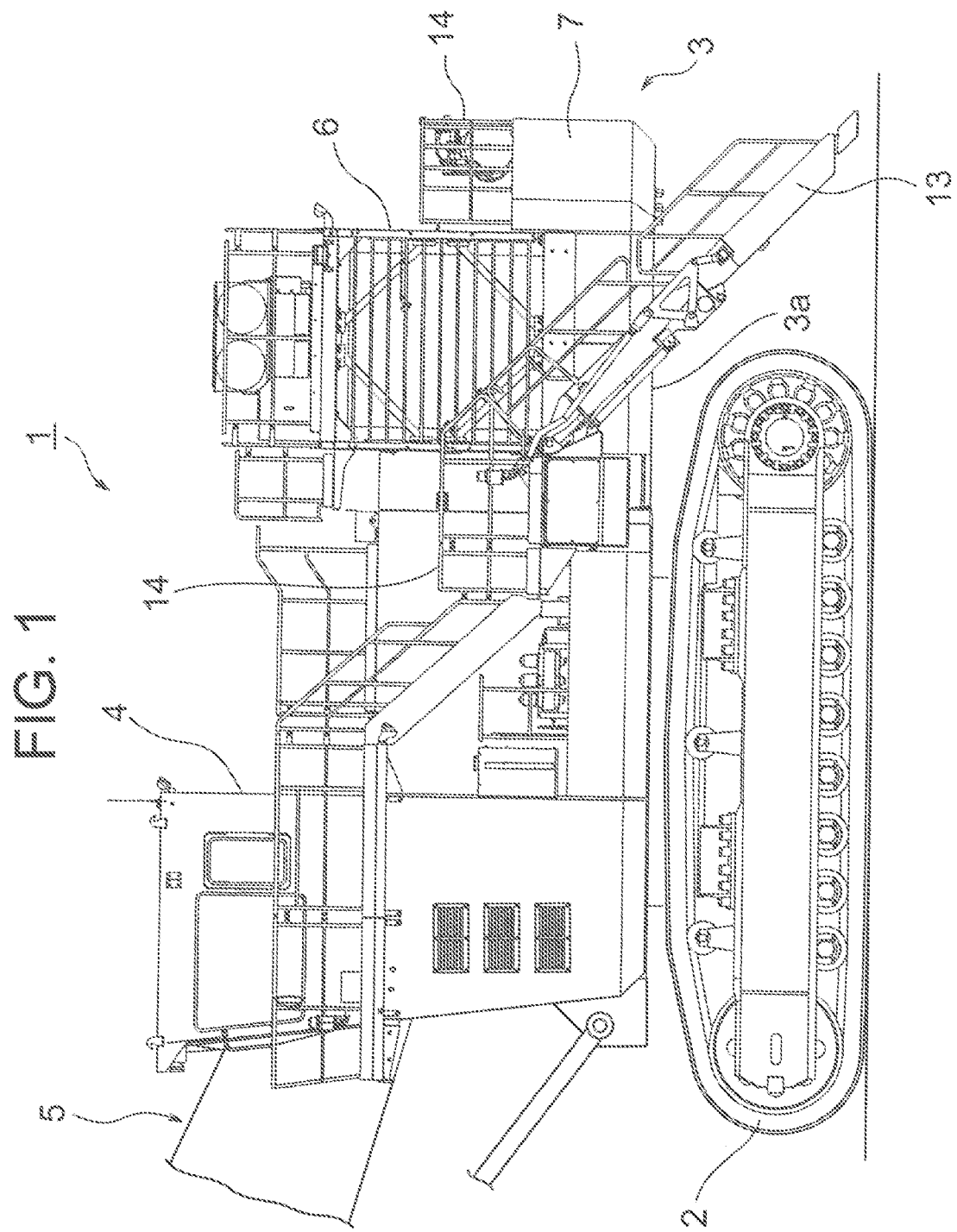
FIG. 1 is a front view of a hydraulic excavator as an example of the industrial machine.
Figure 2:
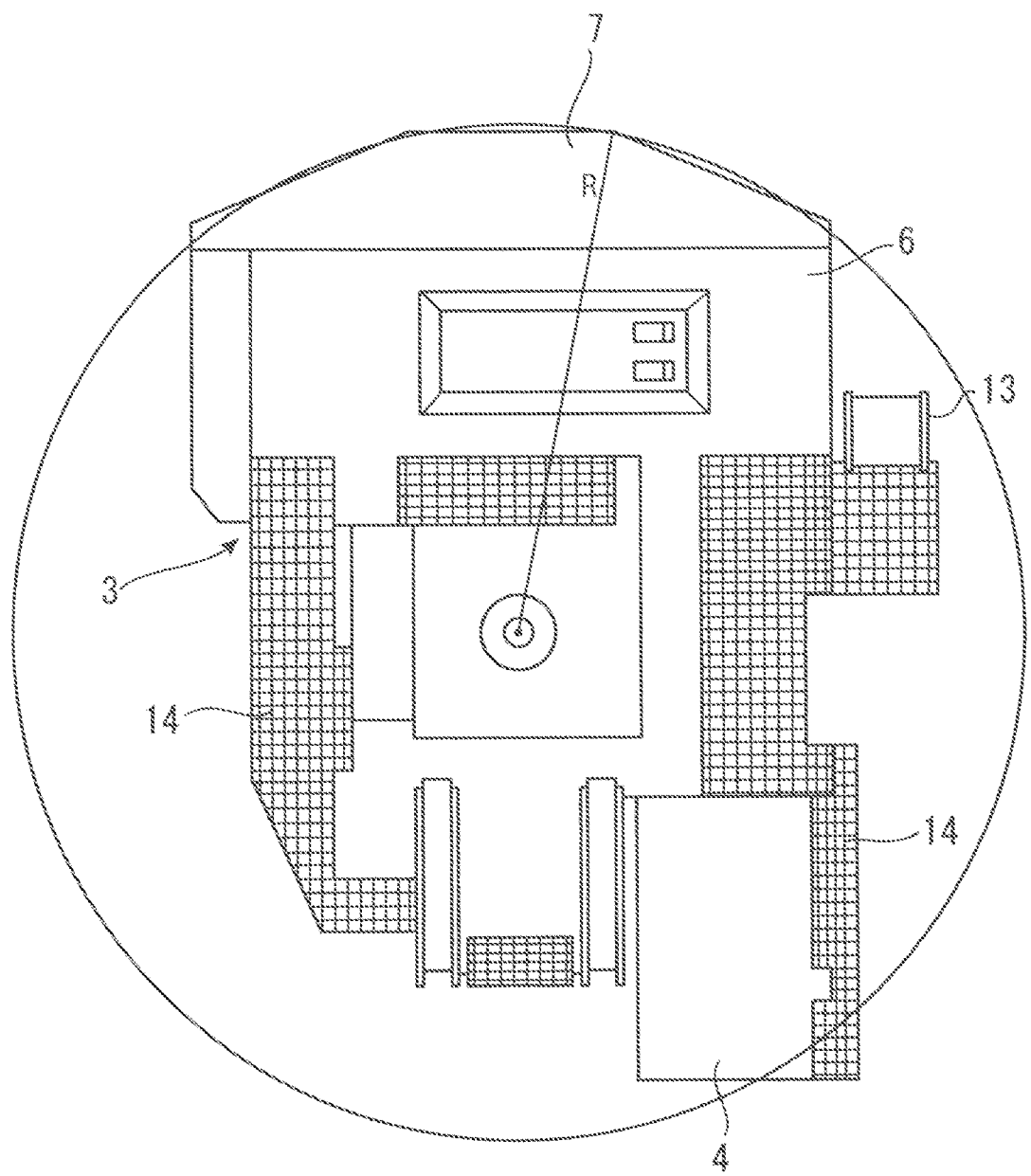
FIG. 2 is a top view of the hydraulic excavator in FIG. 1.
Figure 3:
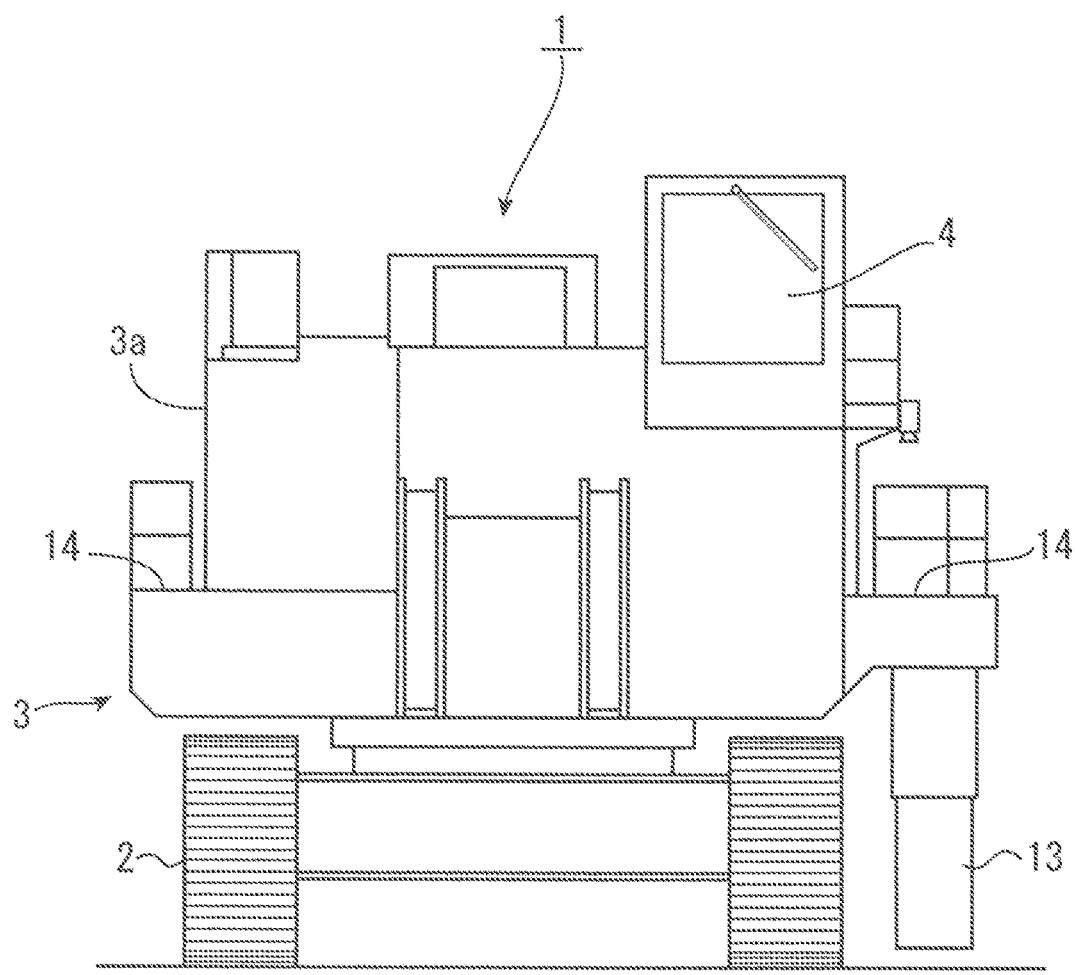
FIG. 3 is a left side view of the hydraulic excavator in FIG. 1.

Embodiments according to the present invention will now be described with reference to the accompanying drawings. First, FIG. 1 to FIG. 3 illustrate the structure of a hydraulic excavator 1 as an example of the industrial machine. FIG. 1 is a front view, FIG. 2 is a top view and FIG. 3 is a left side view of the hydraulic excavator 1. Here, a front working mechanism 5 which will be described later is omitted in FIG. 2 and FIG. 3.

The hydraulic excavator 1 has a lower travel base 2 having a crawler traveling mechanism, and a revolving upperstructure 3 mounted revolvably on the lower travel base 2. The revolving upperstructure 3 is equipped with a cab 4 for an operator aboard the hydraulic excavator to operate the machine, and the front working mechanism 5 is mounted as a working mechanism for work of earth/soil excavation and/or the like. An illustration and details of the front working mechanism 5 are omitted because the specific structure of the front working mechanism is well known.

Thus, the hydraulic excavator 1 which is the industrial machine operates the lower travel base 2 for traveling, the revolving upperstructure 3 for revolving and the front working mechanism 5 to perform the work. Each of the above-described operating parts is driven by a hydraulic cylinder and/or a hydraulic motor, in which a movable section and a driving section to move the movable section form a movable mechanism. Also, any other actuators such as an electric motor and/or the like may be used.

The movable mechanism of the hydraulic excavator 1 is operated by the operator, and the cab 4 is installed in a forward position of the revolving upperstructure 3. On the right side of the cab 4, a facility 6 including a machine room is located rearward of the cab 4 and the front working mechanism 5 which are arranged in an approximately side-by-side position on the revolving upperstructure 3 to which the front working mechanism 5 is mounted, thus forming a revolving upperstructure main unit 3a. Further, a counter-weight 7 is placed at the tail end.

The front working mechanism 5 includes a boom attached to the revolving upperstructure main unit 3a of the revolving upperstructure 3 to be capable of being raised/lowered, an arm coupled to the distal end of the boom to rotate in the vertical direction, and a bucket rotatably coupled to the distal end of the arm for work on earth/soil excavation and/or the like, the boom, the arm and the bucket being driven by the hydraulic cylinders, which are omitted from the drawings. Note that the specific structure of the front working mechanism 5 is well-known in the art.

The revolving upperstructure main unit 3a is further equipped with a ladder 13 for the operator to get into/off the cab 4, and also a catwalk 14 forming a passage. The catwalk 14 is placed on the side of the revolving upperstructure main unit 3a and in a midpoint position in the vertical direction to be protruded in the lateral direction so that a position under the underside of the catwalk 14 is empty space. Further, the ladder 13 is placed to be connected to the catwalk 14. In this connection, the revolving upperstructure main unit 3a is formed of a frame structure, and the catwalk 14 and the ladder 13 are the jutting components extending out from the revolving upperstructure main unit 3a.

The hydraulic excavator 1, having the movable mechanisms as described earlier, is equipped with a surround monitoring device for ensuring safety in the surrounding under operation conditions of the movable mechanism. The surround monitoring device is mounted to the revolving upperstructure 3 and includes a plurality of video cameras capable of shooting moving images. More specifically, in FIG. 4 and FIG. 5, reference sign 15F denotes a front camera, reference sigh 15B denotes a rear camera, and reference signs 15L and 15R denote left-side and right-side cameras. The surrounding of the hydraulic excavator 1 is monitored through the cameras 15F, 15B, 15L and 15R. Incidentally, in the following description, reference sign 15 is used when collectively calling the camera for camera-monitoring.

Figure 4:
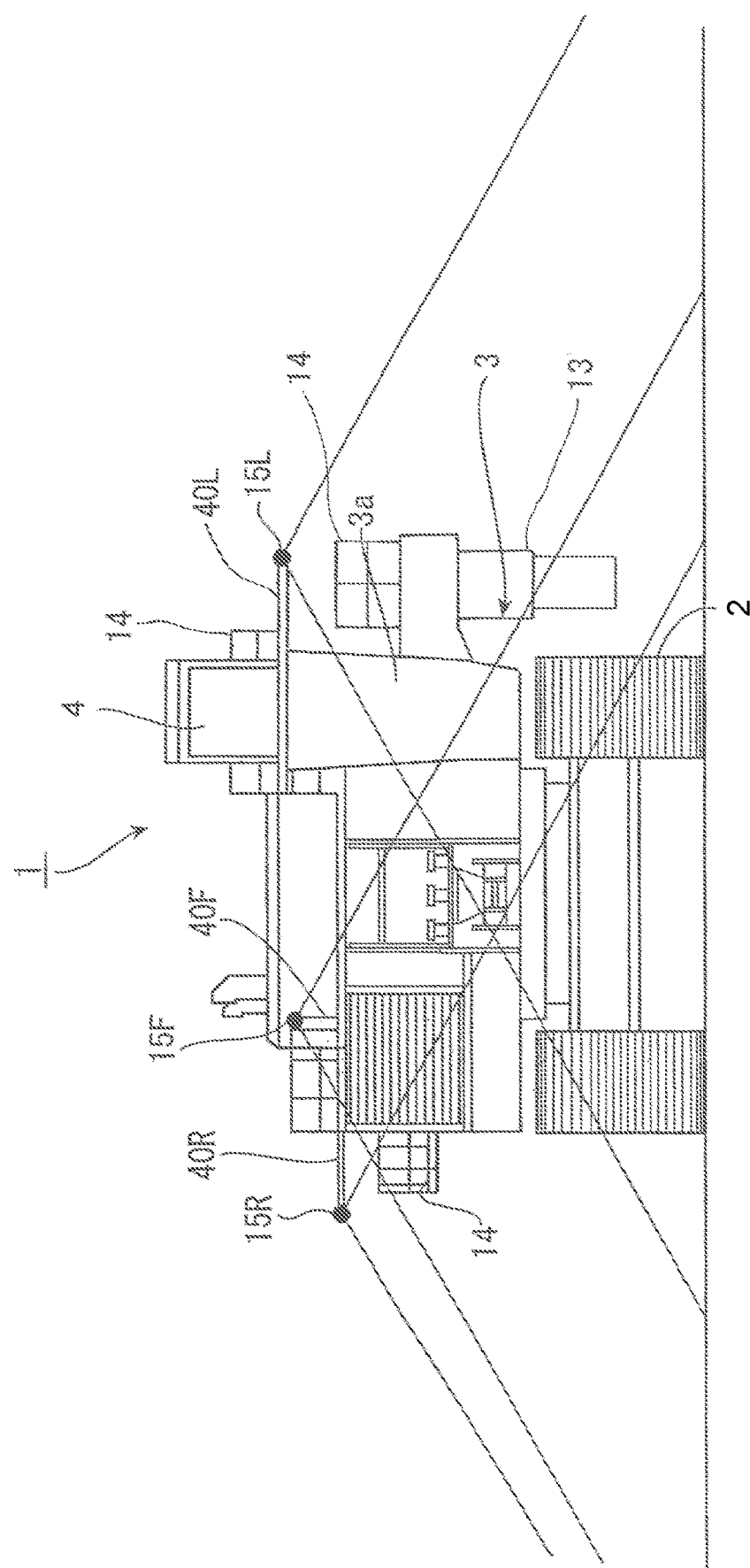
FIG. 4 is a schematic illustration of the field of view of cameras when viewed from a position in FIG. 3.
Figure 5:
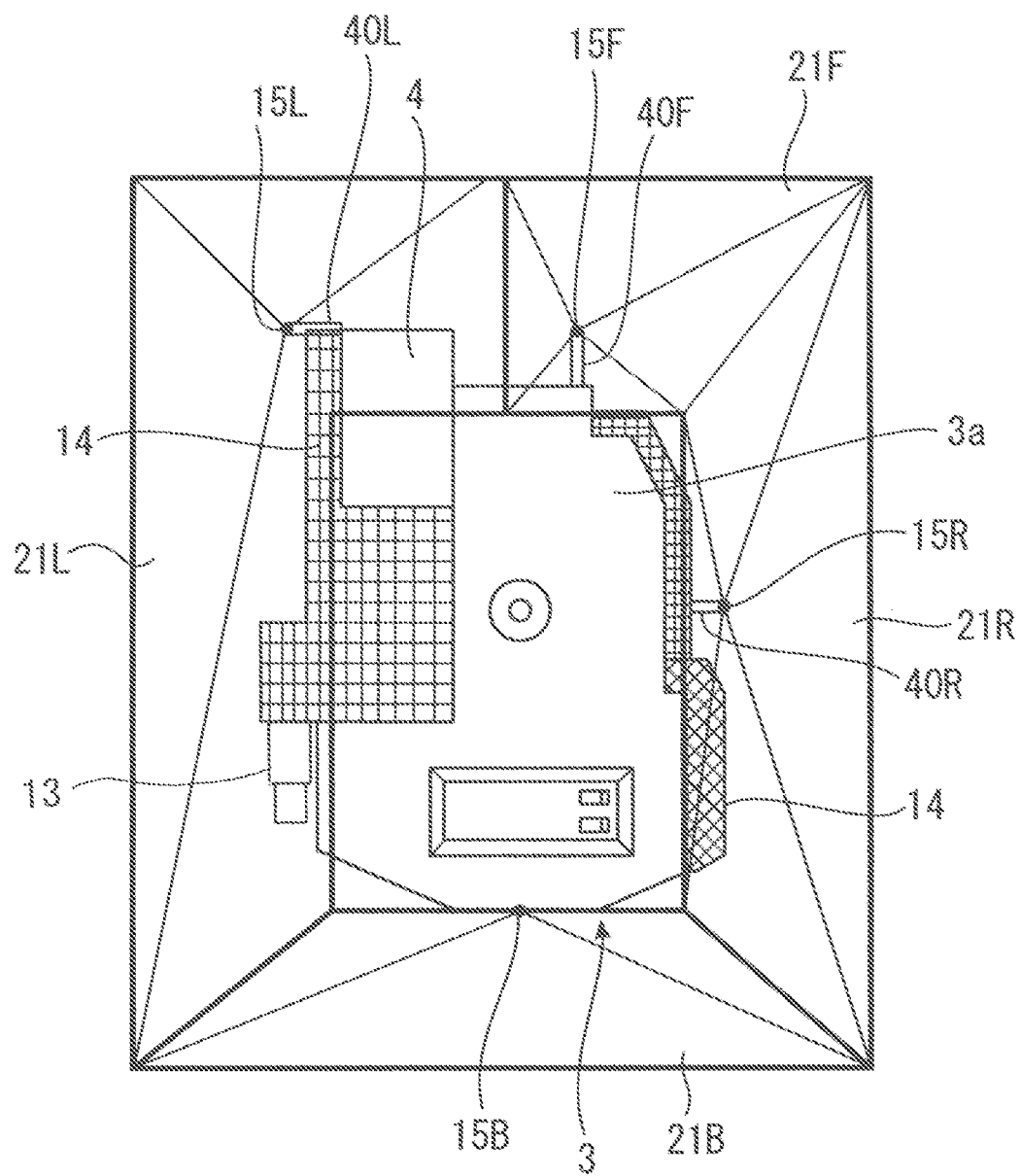
FIG. 5 is a schematic illustration of the field of view of cameras when viewed from a position in FIG. 2.

The cameras 15F, 15B, 15L and 15R are mounted to the revolving upperstructure main unit 3a of the revolving upperstructure 3, and are placed at high elevations so that the optical axis of each camera is oriented in the downward or obliquely downward direction. Thus, as shown in FIG. 4, an image captured by each of the cameras 15 results in a top-view image looking downwardly from above. Installation positions of the respective cameras 15 are determined to have a positional relationship to monitor all around the hydraulic excavator 1. FIG. 5 illustrates example placement of the cameras 15F, 15B, 15L and 15R.

Figure 6:
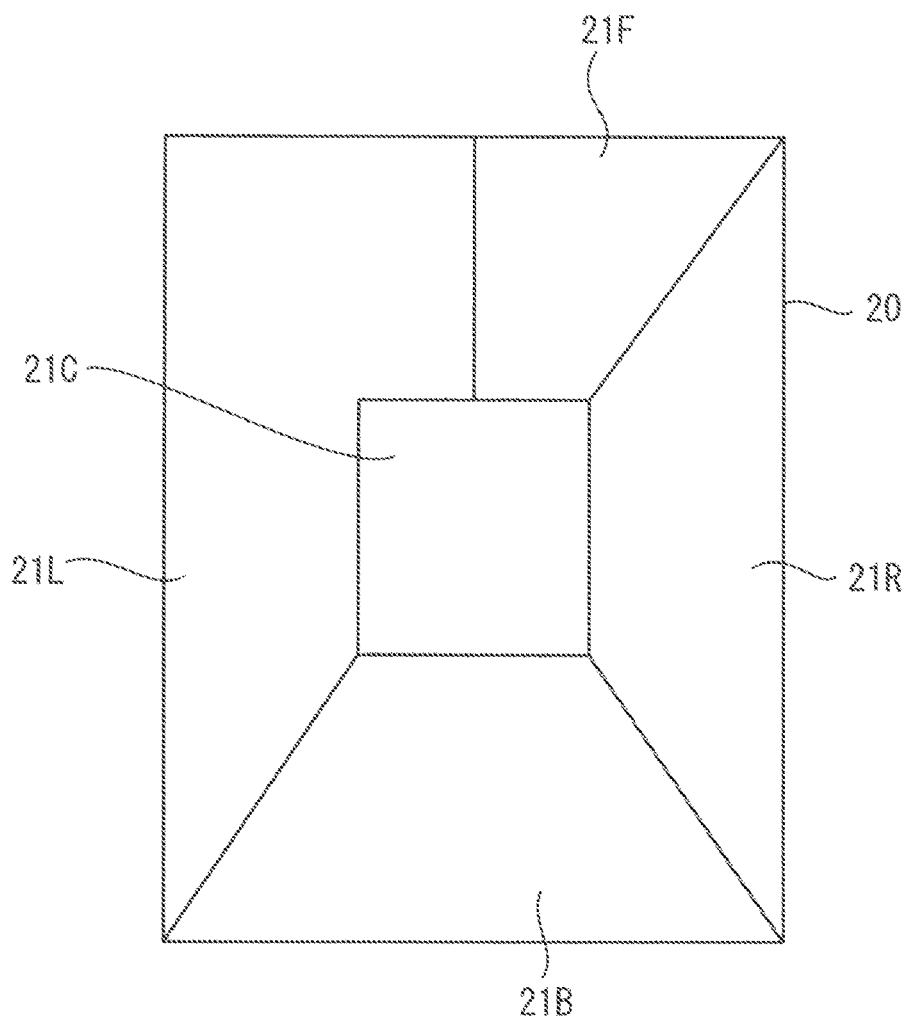
FIG. 6 is a diagram illustrating an example of a display region of each image on the screen of a monitor.

As described above, the image captured by each camera 15F, 15B, 15L, 15R is displayed on a monitor 20 serving as an image displaying unit as illustrated in FIG. 6. Here, the monitor 20 is placed in a position within the cab 4 to allow the seated operator to visually check the monitor 20 from the operator's seat where the operator operates the hydraulic excavator 1.

Figure 7:
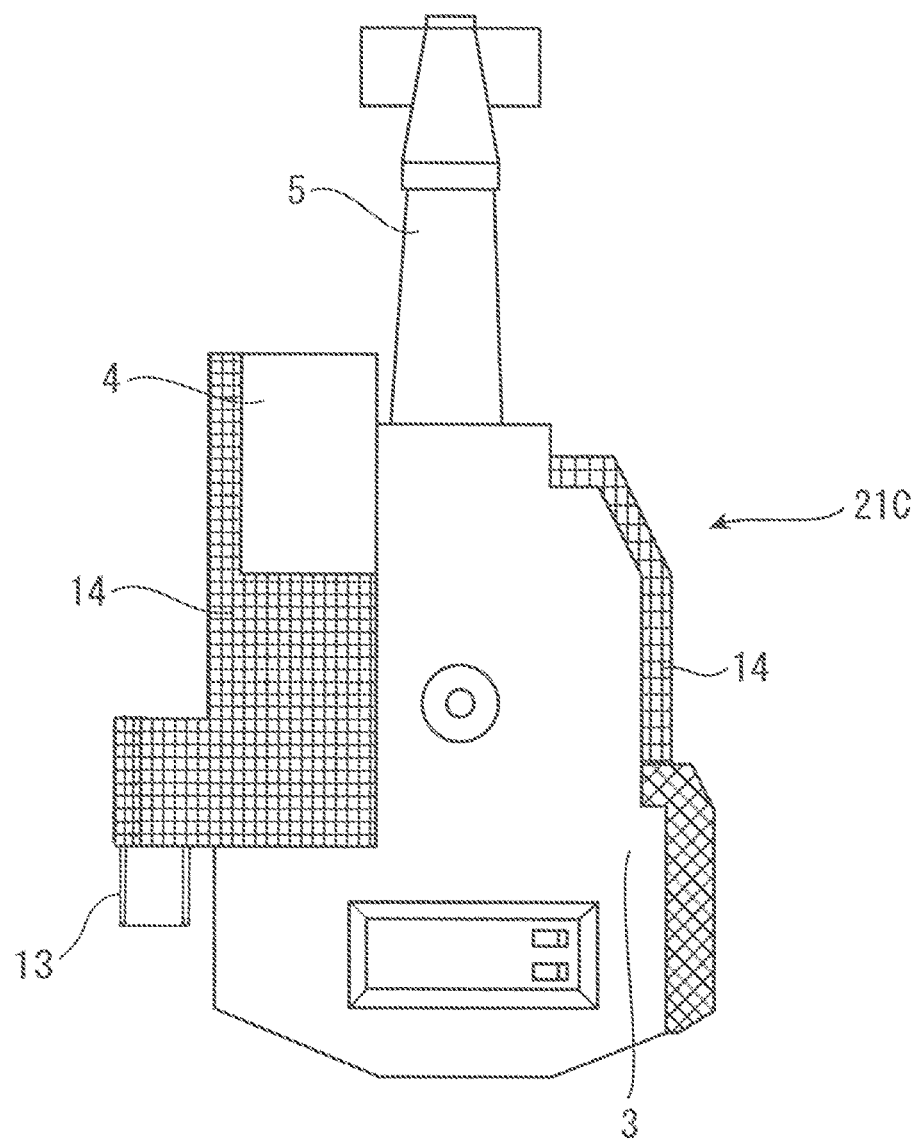
FIG. 7 is a top view illustrating an example of an icon image displayed on the monitor.

The images sent from the respective cameras 15F, 15B, 15L and 15R to be displayed on the monitor 20 are top-view images. The screen of the monitor 20 is split into a plurality of regions, such that the above-described top-view images are respectively trimmed to fit into the predetermined regions. As a result, camera images 21F, 21B, 21L and 21R are displayed on the respective display regions set in the monitor 20. Then, a display region for an icon image 21C is set at the center of the screen, and a planar image of the hydraulic excavator 1 is symbolized and displayed in the display region of the icon image 21C as illustrated in FIG. 7. Here, the icon image 21C results from simplifying the hydraulic excavator which is the industrial machine of interest for monitoring, and in the drawing, the revolving upperstructure 3, the front working mechanism 5 and the catwalk 14 of the hydraulic excavator 1 are displayed. These components are designated with reference signs in FIG. 9.

Figure 8:
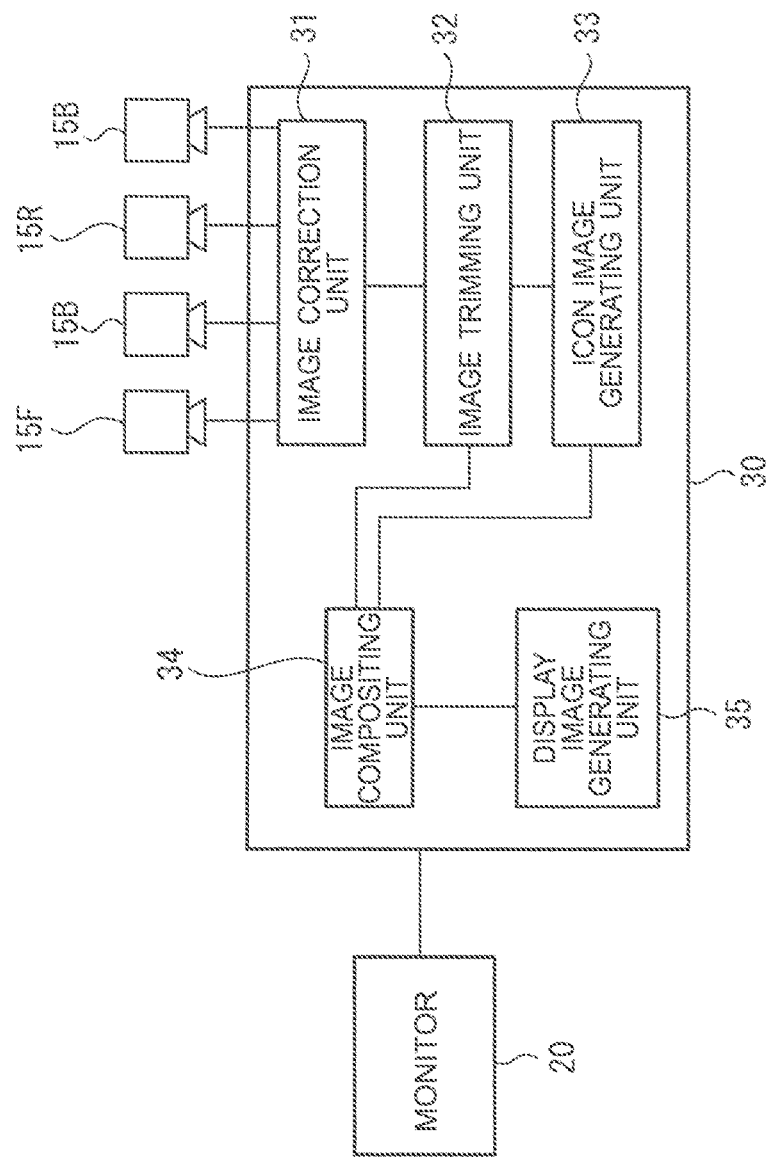
FIG. 8 is a block diagram illustrating the configuration of a display controller of the monitor.

FIG. 8 shows the configuration of a display controller 30 to control displaying of images in the monitor 20. The display controller 30 has an image correction unit 31. The image correction unit 31 performs common image signal processing, including aberration correction, contrast correction, color correction and/or the like, on the camera images sent from the respective cameras 15F, 15B, 15L and 15R, on the basis of camera optical system parameters and/or the like in order to improve the quality of each incoming image.

Because the monitor 20 provides the assignment display using the display regions for the camera images 21F, 21B, 21L and 21R, the display controller 30 includes an image trimming unit 32, in which each of the camera images 21F, 21B, 21L and 21R captured by the respective cameras 15F, 15B, 15L and 15R is trimmed to a size and a shape to be displayed in the corresponding display region.

On the monitor 20 the icon image 21 is displayed together with the camera images 21F, 21B, 21L and 21R of the four cameras. The icon image 21C is generated by an icon image generating unit 33. Then, the individual camera images 21F, 21B, 21L and 21R and the icon image 21C are composited for displaying by an image compositing unit 33. The icon image 21C is displayed on a central position of the monitor 20, and the individual camera images 21F, 21B, 21L and 21R are arranged around the icon image 21C. The output data from the image compositing unit 34 is sent to a display image generating unit 35. By the output from the display image generating unit 34, the above-described images are assigned respectively to the corresponding positions to be displayed.

Because the cameras 15F, 15B, 15L and 15R photograph with their optical axes directed in an approximately vertical direction, all the camera images thus captured are top-view images. The icon image 21C is also an image representing the hydraulic excavator 1 in a planar form. Therefore, the hydraulic excavator 1 and its surrounding circumstances are displayed in a planar form on the monitor 20, enabling the operator to recognize the circumstances during operation of the hydraulic excavator 1 with ease.

Obstructions such as various members or mechanisms may be located in optical paths from the cameras 15 mounted to the revolving upperstructure 3 to the ground. Accordingly, images corresponding to the positions under such obstructions cannot be obtained. For example, regarding a section on the left side of the revolving upperstructure 3 on which the cab 4 is placed, there is a large empty space between the ground contacting the crawler track belt which constitutes the tread of the lower travel base 2 and the position of the underside of the cab 4. Further, because the catwalk 14 and the ladder 13 are located rearward of the cab 4, there is a wide empty space under the undersides of them. This means that, when viewing the revolving upperstructure 3 in top view, the empty spaces contain a spacious hidden area existing due to the cab 4, catwalk 14, ladder 13 and/or the like. In addition, not only the operator, other workers and/or the like may possibly enter such hidden-area spaces, but also tools and other equipment may be placed within such hidden-area spaces. Further, in a heavier hydraulic excavator, there is room enough for accommodating a vehicle and/or the like. Accordingly, in terms of monitoring around the hydraulic excavator 1, it is desirable that the above-described empty space of the hidden area falls within the field of view of the monitoring camera.

Figure 9:
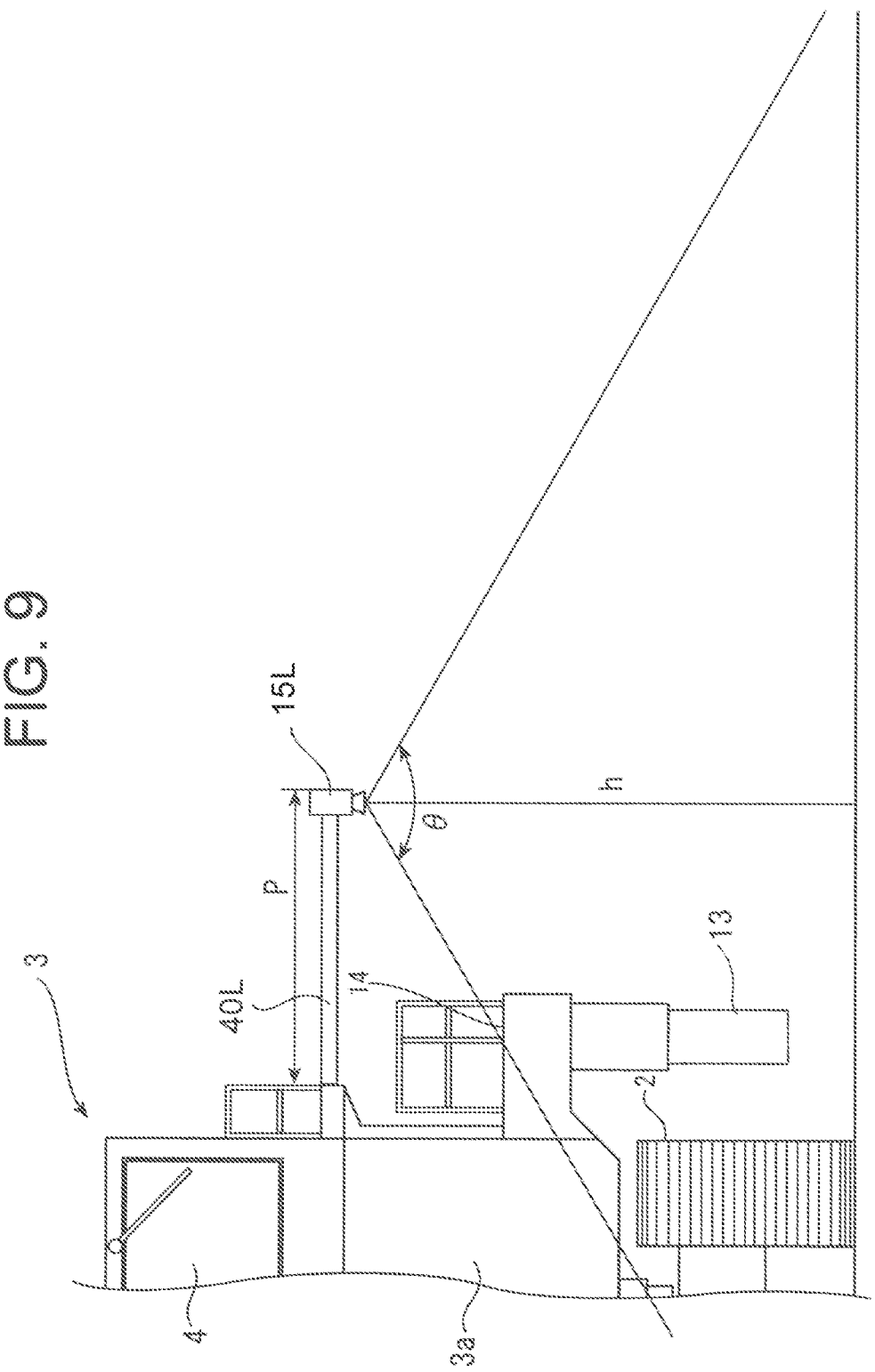
FIG. 9 is an illustration describing the principles for making a hidden area under the underside of a catwalk visible to the camera to fall within the angle of view of the camera.

Given these circumstances, as illustrated in FIG. 9, a support arm 40L is provided to jut from the revolving upperstructure main unit 3a in the lateral direction, so that the camera 15L photographing the region is not mounted to the revolving upperstructure main unit 3a and instead the camera 15L is supported at the distal end of the support arm 40L. Accordingly, the optical axis of the camera 15L mounted at the support arm 40L is located outward of the outer side of the catwalk 14 by dimension p. Further, the camera 15L is located at a height h above the ground. Because of this, at a level of and around the ground surface, the camera 15L is able to have a field of view covering virtually the crawler belt forming part of the lower travel base 2. In addition, because the camera 15L is placed forward of the position of the catwalk 14 with the ladder 13 mounted thereto, the field of view of the camera 15L is able to cover the position under the underside of the catwalk 14.

Likewise, the right camera 15R and the front camera 15F are mounted to support arms 40R and 40F each of which juts from the revolving upperstructure main unit 3a in a predetermined direction, increasing the field of view for the sections. Further, on the monitor 20, the character image 21C is displayed with a range resulting from an increase in the field of view being in a transparent state. In this case, the symbol image of the hydraulic excavator 1 displayed in the icon image 21C includes a part in the transparent state, but the outside shape of the hydraulic excavator 1 is displayed in outline. Accordingly, in the following description, reference sign 40 is used to correctively call the support arm.

In this manner, mounting the camera 15 to the distal end of the support arm 40 provided to jut from the revolving upperstructure main unit 3a enables the field of view covering the hidden area of the revolving upperstructure 3. In this respect, the installation position and the jutting length of the support arm 40 can be determined as appropriate on the basis of the structure of the revolving upperstructure 3. The jutting length is determined with reference to a revolving radius R shown in FIG. 2, and as long as the jutting length is within the revolving radius R, even if the support arm 40 juts greatly from the revolving upperstructure main unit 3a, there is no possibility of the support arm 40 coming into collision with other substance, and the like. The support arm 40 is preferably formed of rigid body, so that the camera 15 is firmly fixed to the support arm 40 in order to prevent the camera 15 from being displaced from its normal position by vibration and/or the like.

Here, in an example embodiment according to the present invention, the support arm 40L for the camera 15L mounted on the left side extends in the lateral direction and the support arms 40F and 40R for the cameras 15F and 15R extend in the forward direction, but the extending direction can be determined based on the position of the hidden area to be displayed on the monitor 20. In the illustrated case, the camera 15B is located in a position on an upper portion of the counterweight 7 without an extra support arm. However, the camera 15B may be supported by a support arm.

The structure designed as described above enables displaying of the hidden sections covered with the revolving upperstructure 3, such as the position under the underside of the catwalk 14 and the like, as well as the sections of the surrounding of the hydraulic excavator 1 on the monitor 20. In addition, in the revolving upperstructure 3 with the camera 15 mounted thereto, even if a section is out of the field of view, the section where a worker and the like may possibly enter is able to be displayed on the monitor 20, enhancing the effectiveness as the surround monitoring.

In the position under the underside of the revolving upperstructure main unit 3a forming part of the revolving upperstructure 3, the hidden area transparently displayed is a section where a person and the like may possibly enter. There's no need to display, for example, a section where a person and the like may not enter such as the tread of the crawler belt and the like. Accordingly, the level position and the jutting length of the support arm 40 to which the camera 15 is mounted may be determined as appropriate on the basis of the position and expanse of a hidden area which is required to be transparently displayed.

Figure 10:
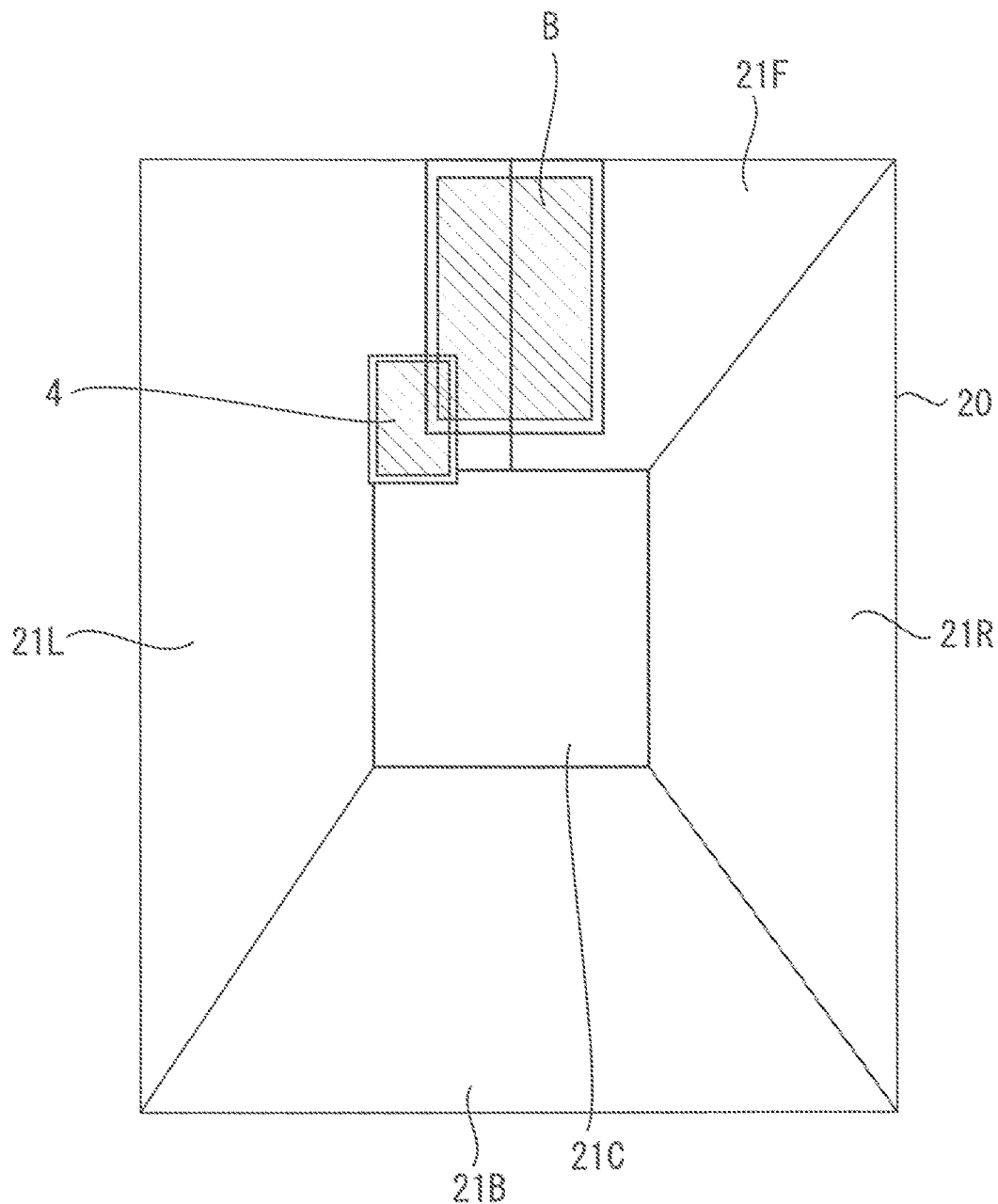
FIG. 10 is an illustration showing another example mode of an image on a monitor including an excavatable range by a bucket.

On the other hand, the hydraulic excavator 1 is used for work on earth/soil excavation and the like, and the front working mechanism 5 is operated. When the front working mechanism 5 is operated for earth/soil excavation, the bucket attached at the distal end is driven from above to cut deep into the earth. Because of this, if a person or a substance is located within the range of motion track of the bucket, the bucket may possibly collide with the person or substance. During the work, there is a necessity to protect the person, substance and/or the like from collision with the front working mechanism 5. Naturally, the operator aboard the cab 4 can visually recognize the motion of the front working mechanism. Given these circumstances, as illustrated in FIG. 10, the monitor 20 is designed to display, as an excavatable range B, a range in which the bucket can make contact with the ground within the reach range of the front working mechanism 5.

The front working mechanism 5 is mounted to the revolving upperstructure 3, so that the front working mechanism 5 revolves in synchronism with the revolving upperstructure 3 when the revolving upperstructure 3 is operated to revolve. Then, the monitoring cameras 15F, 15B, 15L and 15R are also mounted to the revolving upperstructure 3, so that no change occurs in the positional relationship with the front working mechanism 5 on the images captured by the cameras 15F, 15B, 15L and 15R. Therefore, an excavatable range B in which the front working mechanism 5 can make contact with the ground, together with the camera images 21F, 21B, 21L and 21R arranged around the icon image 21C, is displayed on the monitor 20, in which the excavatable range B is determined on the basis of the width dimension of the bucket and the maximum reach length. The buckets are of a plurality of types of varying width dimension. For this reason, the excavatable range B is desirably varied according to the structure of the front working mechanism 5 actually mounted to the hydraulic excavator 12.

In this manner, displaying an excavatable range B on the monitor 20 enables the driving of the hydraulic excavator 1 with reference to the excavatable range B when the hydraulic excavator 1 is travelled and revolved to select an excavation site, facilitating positional adjustment for excavation site. As a result, displaying the excavatable range B on the monitor 20 offers enhanced work efficiencies as well as the ensuring of work safety.

REFERENCE SIGNS LIST

1 Hydraulic excavator
2 Lower travel base
3 Revolving upperstructure
3a Revolving upperstructure main unit
4 Cabin
5 Front working mechanism
15, 15F, 15B, 15L, 15R Camera
20 Monitor
21, 21F, 21B, 21L, 21R Camera image
21C Icon image

The invention claimed is:

1. A hydraulic excavator comprising:
a revolving upperstructure;
a catwalk provided so as to jut outward from the revolving upperstructure along a side of the revolving upperstructure;
a cab installed in a forward position of the revolving upperstructure;
a ladder installed in a rearward position of the revolving upperstructure;
a plurality of monitoring cameras provided in a revolving range defined by a revolving radius of the revolving upperstructure and monitoring surroundings of the revolving upperstructure;
a display controller configured to generate a display image from images captured by the plurality of monitoring cameras;
a monitor for displaying the display image generated by the display controller;
a first empty space existing between the cab and crawler belts forming a lower travel base; and
a second empty space existing at a lower position of the ladder,
wherein the plurality of monitoring cameras include:
a front camera mounted to a first support arm jutted from a front of the revolving upperstructure;
a left camera located above and in front of the catwalk and mounted to a second support arm jutted from a main unit of the revolving upperstructure in a lateral direction and outward from an outer side of the catwalk within the revolving range defined by the revolving radius of the revolving upperstructure, the left camera having a field of view covering the first empty space existing between the cab and the crawler belts;
a right camera located above the catwalk and mounted to a third support arm jutted from the main unit of the revolving upperstructure in the lateral direction and outward from an outer side of the catwalk within the revolving range defined by the revolving radius of the revolving upperstructure; and
a rear camera mounted to a position on an upper portion of a counterweight provided at a tail end of the revolving upperstructure and having a field of view covering the second empty space existing at the lower position of the ladder, and
wherein the display controller is further configured to:
generate top view images looking downward,
generate an icon image representing a planar image of the hydraulic excavator with an outline of the hydraulic excavator being shown in a graphic form,
execute composite processing to arrange the top view images around the icon image, and
display the top-view images on the monitor to include a part of a section hidden within a display region of the icon image.

2. The hydraulic excavator according to claim 1, wherein the icon image has the revolving upperstructure and the catwalk represented as an outline.

3. The hydraulic excavator according to claim 1, further comprising:
a movable front working mechanism projecting beyond the revolving upperstructure,
wherein the icon image has a movable range display region for displaying a motion track of the front working mechanism.

* * * * *